Oct. 30, 1934.                W. A. McKETTRICK                1,978,643
                                    JOINT
                              Filed July 18, 1933
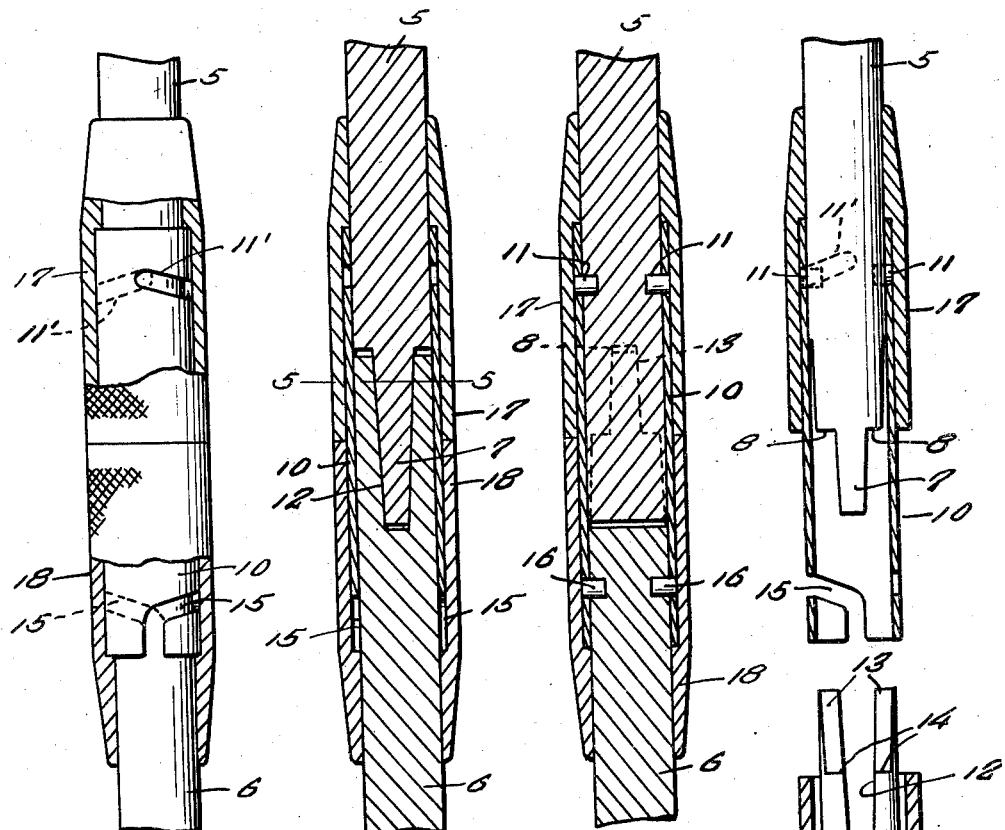
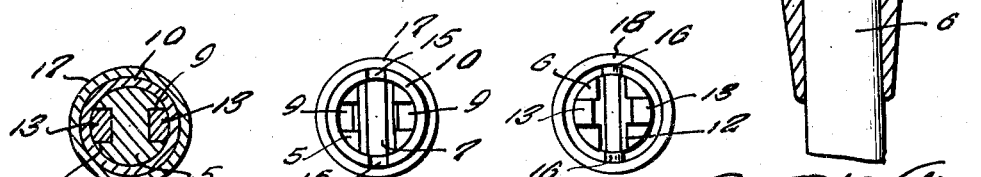

Patented Oct. 30, 1934

1,978,643

UNITED STATES PATENT OFFICE 1,978,643

JOINT

William A. McKettrick, Tacoma, Wash.

Application July 18, 1933, Serial No. 681,010

1 Claim. (Cl. 287—104)

This invention relates to new and useful improvements in coupling joints and has as its object the provision of improved joints for use in coupling together two members in alinement in a manner to provide a rigid and secure joint therebetween.

In accordance with the present invention the joint will be found especially useful for securing the head of a golf stick to its shank or handle, or for securing an extension to the handle or shank of a golf stick, as well as for use in joining two members together whereof a tight, durable and efficient joint is desired.

The invention together with its numerous objects and advantages will be best understood from a study of the following description taken in connection with the accompanying drawing wherein:

Figure 1 is a view illustrating the application of the joint to a golf stick for joining the stem of the head to the shank or handle of the golf stick, certain parts being broken away and shown in section.

Figure 2 is a longitudinal sectional view through the structure shown in Figure 1.

Figure 3 is a view similar to Figure 2 and taken at right angles thereto.

Figure 4 is a view partly in section and partly in elevation showing the members to be joined, separated.

Figure 5 is a sectional view taken substantially on the line 5—5 of Figure 2.

Figure 6 is an end elevational view of one of the members and

Figure 7 is an end elevational view of the other of the members.

Referring to the drawing by reference numerals it will be seen that one of the members to be joined is designated by the reference numeral 5, and the other of said members is designated by the reference numeral 6. In the present instance let it be assumed that the member 5 is the shank or handle of a golf stick, while the member 6 is the stem of the head of the golf stick. The member 5 may also be considered the male member and the same at one end provided with a substantially wedge shaped tongue 7, shoulders 8 at the inner end of the tongue, and grooves 9 extending longitudinally from the shoulders 8 at opposite sides of the tongue 7 and in a direction reverse to the tongue. Upwardly or inwardly from the inner end of the grooves 9 the member 5 is provided at opposite sides thereof with pins 11 arranged to engage short spiral slots 11' provided in a metallic sleeve 10 and the end of the sleeve telescopically receives the end of the member 5.

The member 6 has an end thereof formed complemental to the member 5, and in this connection it will be seen that the member 6 is bifurcated at said end to provide a substantially tapered recess 12 to receive the tongue 7. The member 6 at opposite sides of the recess 12 and at the open end of the recess is reduced to provide pins 13 to engage the grooves 9 in the member 5 and shoulder 14 to abut the shoulders 8. In joining the complementary ends of the members 5 and 6, the recess and pin equipped ends of the member 6 is passed upwardly of the free end of the sleeve 10 to engage the tongue 7 of the member 5 in the recess 12, and the pin extensions 13 of the member 6 in the grooves 9 for joining the members 5 and 6 against relative rotating movement. At said free end thereof the sleeve 10 is provided with diametrically opposed bayonet slots 15 the inner ends of which are spirally arranged as shown in the drawing. Inwardly from the sleeve 12 the member 6 is provided with oppositely extending pins 16 for engaging the slots 15 so that when the complementary formed ends of the members 5 and 6 are engaged, and the member 6 is rotated relative to the member 5, the engaged end of the members are drawn inwardly into positive engagement with one another relative to the sleeve 10 to thus positively secure the ends of the members 5 and 6 in joined relationship.

For substantially concealing the joint between the members 5 and 6 there is provided an outer sleeve or ferrule which in the present instance is divided transversely into two half sections 17 and 18 respectively. One of the sections, in the present instance, the section 17 is mounted on the member 5, and the other of the sections, in the present instance, the ferrule section 18 is mounted on the member 6. The ferrule sections 17, 18 at one end are respectively engaged with the respective members 5 and 6 fitting snugly about said members as shown in the drawing. For the major portion of their respective length the ferrule sections 17 and 18 are of sufficient interior diameter to accommodate the sleeve 10, and it will thus be seen that when the ends of the members 5 and 6 are engaged and drawn inwardly of the sleeve 10 in a manner hereinbefore explained, the meeting ends of the ferrule sections 17 and 18 are brought into intimate abutting engagement at about the transverse center of the sleeve 10. In actual practice it is intended to sweat the sections 17, 18 of the ferrule onto the sleeve 10 by a special process which would be a part of the manufacturing. Sweating of the ferrule sections 17, 18 to the sleeve 10 for substantially the entire length of the sleeve will strengthen the metal, especially at the ends of the slot 15 in the sleeve 10, and will make the sleeve 10 and the ferrule sections 17, 18 substantially one rigid unit part of the joint.

While I have specifically illustrated and described the invention as being applied to a golf club it is to be understood that the invention is in no wise to be restricted to this single use nor is it intended to restrict the invention to the precise details of construction, combination and arrangement of elements herein illustrated and described, other than may be necessary to meet the requirements of the prior art and scope of the appended claim.

Having thus described my invention, what I claim as new is:—

In a coupling of the class described, a male member provided with a single tongue having spaced lateral enlargements cooperating with said tongue to define grooves extending longitudinally of said tongue, said lateral enlargements being spaced inwardly from the free end of said tongue, a female member having a pair of spaced tongues adapted to receive therebetween the tongue of the male member, the tongues of the female member having reduced extensions to engage said grooves, a sleeve disposed about the ends of the male and female members, and inter-engaging means on said ends of the male and female members, and on said sleeve for drawing the tongue equipped ends of said members inwardly toward one another relative to the sleeve upon rotation of one of said members relative to the sleeve.

WILLIAM A. McKETTRICK.